United States Patent
Engler et al.

(10) Patent No.: US 6,563,707 B1
(45) Date of Patent: May 13, 2003

(54) CHASSIS FOR MOUNTING COMPONENT UNITS OF AN ELECTRIC SWITCH CABINET FOR ELEVATORS AND ESCALATORS

(75) Inventors: Hartmut Engler, Berlin (DE); Marvin Dehmlow, Berlin (DE); Andreas O. Belkner, Berlin (DE); Vera Else Marta Steifa, Berlin (DE); Wolfgang Schoppa, Vehlefanz (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/069,144
(22) PCT Filed: Sep. 14, 2000
(86) PCT No.: PCT/US00/25178
§ 371 (c)(1),
(2), (4) Date: Feb. 14, 2002
(87) PCT Pub. No.: WO01/20735
PCT Pub. Date: Mar. 22, 2001

(51) Int. Cl.⁷ .................................................. H05K 7/20
(52) U.S. Cl. .................. 361/695; 361/628; 361/643; 361/652; 361/656; 361/657; 361/658; 200/293
(58) Field of Search .................. 361/610, 611, 361/622, 627, 628, 629, 636, 640, 656, 658, 657, 673, 674, 676, 679, 694, 695; 174/99 R, 99 B; 200/293–296

(56) References Cited

U.S. PATENT DOCUMENTS

| | | | |
|---|---|---|---|
| 3,354,357 A | * | 11/1967 | Jorgensen et al. ......... 174/99 B |
| 3,787,712 A | * | 1/1974 | Diersing ................... 174/71 B |
| 4,729,059 A | * | 3/1988 | Wang ........................... 361/56 |
| 4,910,770 A | * | 3/1990 | Collins et al. ............... 361/657 |
| 5,473,507 A | | 12/1995 | Schwegler et al. |
| 5,644,472 A | | 7/1997 | Klein |
| 6,134,104 A | * | 10/2000 | Mohi et al. .................. 165/185 |
| 6,160,700 A | * | 12/2000 | Wise et al. .................. 200/293 |
| 6,411,500 B1 | * | 6/2002 | Kaaden et al. ............... 361/614 |

FOREIGN PATENT DOCUMENTS

| | | | | |
|---|---|---|---|---|
| DE | 3612511 A1 | 1/1987 | ............ | H02B/1/08 |
| DE | G 91 16 755.8 | 12/1993 | ............ | H05K/7/18 |
| DE | 44 15 200 C1 | 8/1995 | ............ | H05K/7/18 |
| DE | 196 12 167 A1 | 10/1997 | ............ | H05K/5/02 |
| DE | 197 24 312 C1 | 12/1998 | ............ | C08L/23/26 |

\* cited by examiner

Primary Examiner—Boris Chervinsky

(57) ABSTRACT

A chassis (11) for mounting component units (17, 19) of an electric switch cabinet for elevators and escalators, comprising at least one shaped part (15) serving as main supporting member, said shaped part being composed with a plastics material of lasting resetting force with respect to compression and being provided with at least one receiving recess (29, 31) for receiving a component unit (17) of a first type in substantially form-locking manner, and comprising at least one mounting rail (21) serving as auxiliary supporting member and anchored in the shaped part (15), said mounting rail (21), at least over a predetermined partial length thereof, being accessible in a free space (42) of the shaped part (15) for mounting at least one component unit (19) of a second type to said mounting rail (21), with said free space (42) being designed to selectively receive component units of the second type in different numbers, shapes and sizes.

22 Claims, 11 Drawing Sheets

CHASSIS FOR MOUNTING COMPONENT UNITS OF AN ELECTRIC SWITCH CABINET FOR ELEVATORS AND ESCALATORS

TECHNICAL FIELD

The invention relates to a chassis for mounting component units in an electric switch cabinet for elevators and escalators.

BACKGROUND ART

For control of electric elevators and escalators, there are required electric control means that are usually accommodated in control or switch cabinets installed in a machine room or hoistway in a building or in an escalator or moving steps. Such switch cabinets conventionally have a sheet metal housing having attached thereto component units, for example, circuit boards, relays, capacitors, transformers etc., by means of frame parts, screws, spacer bolts, brackets etc. One thus arrives at a large amount of parts. It is quite cost-intensive and time-consuming to manufacture all necessary parts, to mount and assemble them and to disassemble them again for maintenance, repair or recycling purposes.

DE 36 12 511 A discloses a distribution cabinet comprising a housing and a component carrier inserted in the housing. The housing comprises a rigid frame consisting of square metal sections and having vertical supports and horizontal rails as well as struts extending along the housing edges. A bottom part, a cover part and side parts of the housing are formed by shaped parts of rigid expanded plastics material and are provided with mounting blocks for mounting the apparatus carrier and with reinforcing ribs. The component carrier has rails for attachment of electrical instruments and equipment. Such a distribution cabinet consists of a plurality of individual components that have to be connected to each other by connecting members and is relatively heavy.

For heavyweight components, such as e.g. transformers or filters, there is a particularly high risk of damage, for instance in the form of broken bolts, screws, anchorages, etc., as a result of vibrations or shocks during transport. Switch cabinets for elevators and escalators furthermore contain noise generating components, such as power switches and relays. Thus, sound-absorbing materials must additionally be accommodated in such a switch cabinet.

It is known from U.S. Pat. No. 5,644,472 A to reduce the assembly cost for desktop computers by inserting individual components of such a computer, such as the main board along with the processor, the fixed disk and the fan, into recesses matched to the shape thereof which are formed in a carrier of foamed urethane material composed of an upper carrier part and a lower carrier part, to thereby maintain the components in their desired positions. Although these components are first held in positive or form-locking manner by the foamed urethane material, it may happen due to vibrations or shocks during transport or during operation of such a desktop computer that the receiving recesses for the individual components are undesirably increased since the foamed urethane material does not have a sufficient resetting force with respect to compression forces, so that deformations of the receiving recesses as a result of vibration and/or shock forces are permanent. This may be counteracted according to the reference, by attaching some or all of the components accommodated in the carrier to the carrier by means of fastening elements such as screws, brackets etc. However, this in turn causes a corresponding increase in manufacturing and mounting cost.

It is known from DE 91 16 755 U1 and the corresponding U.S. Pat. No. 5,473,507 A to make such a carrier for a computer or a measuring apparatus of expanded polypropylene (EPP), a material with high stability in shape and elastic resetting force with respect to compression. Individual components of the computer, such as in particular a fan, a fixed disc, a main board, a loudspeaker and capacitors, are each inserted in a receiving cavity of the carrier that is closely matched to the outer shape of the particular component. Due to the high resetting force of the plastics material used and the snug fit of the individual components, the components are permanently retained in their position. There are thus no additional fastening elements provided, so that an overall reduction in manufacturing and mounting cost is obtained.

However, such carriers are designed for receipt of comparatively light-weight computer components which remain identical in their outer shape for various computer models, and are not suited without further ado as carriers for elevator and escalator switch cabinets that must carry components or components units that are not only relatively heavy in part, but which in part may also have quite different shapes and/or may be provided in different numbers, depending on the particular model and intended application of the particular switch cabinet. If the conception of the above-mentioned carriers were used for computers for elevator and escalator switch cabinets, a matched shaped plastics part of its own would have to be produced for each switch cabinet model, which would require a corresponding number of injection molds. In the light of the comparatively low number of pieces per switch cabinet model for escalators and elevators, as compared with mass-produced apparatus like computers, this would constitute an unbearable cost expenditure.

DISCLOSURE OF INVENTION

It is the object of the invention to make available a chassis of the type indicated at the outset, through which the manufacturing and mounting costs for elevator and escalator switch cabinets can be reduced by making use of the afore-mentioned conception for carriers of computer components, while simultaneously reducing the possibility of damages, and improving both noise attenuation as well as usability for various switch cabinet models.

A chassis of the type according to the invention comprises a shaped part (molded part) serving as main supporting member, which is composed with a plastics material with lasting resetting force with respect to compression and is provided with at least one receiving recess for receiving a component unit of a first type in substantially positive snug fitting or form-locking manner. In addition thereto, a chassis of the type according to the invention is provided with at least one mounting rail serving as auxiliary supporting member and anchored in the shaped part, said mounting rail, at least over a predetermined partial length thereof, being accessible in a free space of the shaped part for mounting at least one component unit of a second type to said mounting rail, with said free space being designed and dimensioned such that such component units of the second type can be received in different numbers, shapes and sizes.

In an embodiment of the invention, the shaped part consists of expanded polypropylene (EPP). However, any other plastics material with stability in shape and sufficient lasting resetting force as regards compression may be used as well. Alternative materials are, for instance, polyurethane and polyethylene. Plastics materials are preferred that can be injection-molded in an injection mold also as larger shaped parts.

Each of the component units of a first type has associated therewith a receiving recess of its own of the chassis, which is closely matched to the outer shape of the respective component unit and receives this component unit to a predetermined insertion depth. Preferably, the respective receiving recess is dimensioned such that the associated component unit is received therein in a press fit. Due to the high resetting force of the plastics material used, a holding force is exerted on the respective component unit such that it is permanently held in its position. The component units of the first type merely need to be inserted in the receiving recesses provided therefor, so that an overall reduction of the manufacturing and mounting expenditure is obtained. For such component units, in the event they are too heavy to be still safely held in their receiving recesses by the resetting force of the plastics material of the shaped part also in case of tipping of the chassis, there may be provided additional fastening elements for safely fixing such component units.

Due to the fact that supporting rails, supporting frames and other supporting members of conventional switch cabinets for elevators, escalators and moving steps have all been replaced by a shaped part of plastics material, there chassis according to the present invention achieves considerable noise attenuation as compared to the prior art. This is enhanced still further if noise-generating component units, in the receiving recesses thereof, are surrounded in part by the noise-absorbing plastics material of the shaped part.

In a plastic shaped part as used for the chassis according to the invention, cooling air can be directed and channelled more effectively than in conventional switch cabinets. The cooling air can be better directed towards component units requiring cooling, so that a reduced cooling capacity is sufficient or an increased cooling efficiency can be obtained.

In a preferred embodiment of the invention, the chassis is open at least in the upward direction. The individual component units thus are not enclosed on all sides, but project upwardly from the respectively associated receiving recesses providing especially good accessibility in the event of maintenance or repair as well as facilitated cooling are rendered possible.

Due to the fact that the component units of the second type are not received in a receiving recess designed to receive the same in a snug or form locking manner, but are received in the free space of the shaped part that is not configured on the shape thereof, increased flexibility to the effect is obtained that mutually different circuit arrangements can be arranged in a specific chassis, for example circuit arrangements with different power demands having power components in different numbers and/or of different shape. Those component units that are identical for all different circuit arrangements (components units of the first type) are received in a form-locking manner by receiving recesses that are matched to the outer configuration thereof Those component units which for the different circuit arrangements are of different shape or size or are present in different numbers (component units of the second type), are accommodated in one or more free spaces of the shaped part. The result of this embodiment according to the present invention is that it is not necessary to manufacture a shaped part of its own for receiving each circuit arrangement of different type, but that identical shaped parts may be used for a larger number of different circuit arrangements. This leads to a considerable reduction in manufacturing costs as a larger number of shaped parts can be produced using one injection mold.

Due to the fact that the component units of the second type are not held with the aid of the resetting force of the plastics material of the shaped part, the chassis according to the present invention provides at least one mounting rail that is anchored in the shaped part and is accessible in the region of the free space for mounting one or more component units of the second type.

The component units of the second type thus in the end are carried by the shaped part of the chassis as well, however not directly, like the component units of the first type, but by means of the mounting rail.

A further advantage in using a mounting rail consists in that the load of a component unit mounted to the mounting rail, by means of the supporting rail, can be introduced into areas of the shaped part which, due to the overall shape of the shaped part, are capable of supporting particularly high loads, possibly to a much higher extent than those areas of the shaped part adjacent the component unit mounted to the supporting rail.

Preferred as mounting rails are rails that have become widely available and standard in switch cabinet construction. Particularly preferred are so-called top hat rails according to European standards EN 50022 and EN 50045 as well as so-called C-rails according to EN 50035. However, other constructions may be used as well, such as, for example, perforated rails and perforated angle pieces, threaded hole rails and threaded hole angle pieces as well as profiled rails of other types that serve for installation of components.

A top hat rail is an approximately U-shaped rail having a rail bottom with a rail side wall upstanding from each of the two longitudinal sides thereof, the free end of each side wall being provided with a rail edge projecting outwardly from the respective rail side wall and serving for attachment of component units with fasting elements of complementary design. In preferred embodiments of the invention, the mounting rail consists of metal. However, it may also be made of ceramics or plastics material of sufficient hardness, dimensional stability and breaking strength.

In a further embodiment of the invention, the mounting rail is held in the shaped part so as to be longitudinally slidable to provide for easier insertability of the mounting rail in the shaped part and easier assembly of one or more component units of the second type in the free space at the mounting rail. The longitudinal slidability of the mounting rail in both of its longitudinal sliding directions may be unlimited, in particular if the chassis, in the state of use thereof, is received in an enclosing casing or switch cabinet housing that limits the longitudinal sliding motion of the mounting rail in both directions. A limitation of the longitudinal slidability of the mounting rail, at least in one of its longitudinal sliding directions, may also be obtained by a longitudinal sliding motion stopper formed in the shaped part.

In a still further embodiment of the invention, a rail anchoring element is releasably mounted in at least one longitudinal location of the mounting rail, with said rail anchoring element being received in an anchoring receiving opening of the shaped part of approximately matching shape. The rail anchoring element, for example, is an about disk-shaped plastic part that is slid onto the mounting rail and surrounds in particularly the outer edges thereof so that these cannot cut into the plastics material of the shaped part. Moreover, the rail anchoring element can be provided with a disk area that is much larger than the cross-sectional area of the mounting rail, whereby the pressing force exerted by the mounting rail can be distributed via the rail anchoring element to a considerably larger area of the shaped part than in case of the direct receipt of the mounting rail by the shaped part.

In case the chassis is to accommodate component units which, for example with regard to their weight, should be secured in particular manner against the effects of vibrations, shocks and tipping of the chassis, such as during transport thereof, an embodiment of the invention provides for the arrangement of at least one dowel-like fastening element in a surface of the shaped part, at which such a component unit can be fixed, either directly or by means of a holding device between the component unit and the dowel-like fastening element. As such a dowel-like fastening element, there is suitable in particular a dowel with large radial anchoring area that was developed for sandwich type plaster boards and is available e.g. from the company Fischer (Arthur Fischer GmbH & Co. KG, Weinhalde 14–18, D-72178 Waldauchtal, Germany) under the designation GK. By means of this anchoring area, tensile forces exerted on the dowel in case of acceleration forces of the type mentioned, are converted primarily to compression forces with respect to the plastics material of the shaped part. Thus, the plastics material of the shaped part is subject predominantly to compression forces which the shaped part plastics material of the type preferred can withstand to a much higher extent than tensile forces.

In a chassis according to the invention, electric connecting cables must be accommodated for electrically interconnecting component units and/or apparatus located inside the chassis and/or outside the chassis. In a preferred embodiment of the invention such cables are housed in one or more cable ducts that are molded in the shaped part. In the event that the chassis accommodates component units in different numbers and/or of different power categories, electric connecting cables in corresponding numbers and/or of corresponding diameter must be accommodated as well. At least one cable duct of the chassis thus is preferably designed such that it is capable of accommodating different numbers of cables and/or cables of different thicknesses. In a particularly preferred embodiment, at least one cable duct is provided with at least one strain relief means. The strain relief may be formed by strain-relieving constrictions of the respective cable duct, into which at least one cable is urged. Along the cable duct, there may also be provided several strain-relieving constrictions so as to ensure that cables of short length are supported by at least one strain-relieving location, and that cables of greater length experience strain-relief at several locations along their longitudinal extension.

Particularly high strain relief for a cable to be inserted in the chassis is obtained in a still further embodiment of the invention in which the cable is placed in the injection mold for molding the shaped part and, during injection molding of the shaped part, is embedded in the shaped part plastics material in strain-relieving manner.

In a still further embodiment of the invention the shaped part has at least one fan receiving recess for receipt of at least one motor-driven fan for ventilating a ventilation space of the shaped part. The ventilation space is constituted in essence by the entire empty space of the shaped part that is not filled with shaped part plastics material and component units inserted in the shaped part.

Unlike in traditional switch cabinets in which cooling air circulates in substantially uncontrolled manner through the entire switch cabinet interior, a chassis according to the invention, due to the configuration of the shaped part, can ensure purposeful cooling air control and cooling air distribution. By corresponding design of the empty space of the shaped part, the cooling air may be directed in more purposeful manner to component units with a higher need of cooling.

Due to the fact that as in a conventional switch cabinet in which the entire interior of the switch cabinet constitutes the ventilation space, the chassis according to the present invention uses only the empty space of the shaped part, which can be designed purposefully, so that a comparatively low power fan is sufficient to generate a positive ventilation pressure which prevents the ingress of dust or other dirt particles into the interior of the switch cabinet, with the air sucked in by the fan being filtered. The effect achieved thereby is that only filtered air reaches the interior of the switch cabinet and unfiltered air cannot enter into the switch cabinet interior via slots, crannies and other openings which cannot be avoided in switch cabinet housings of the usual kind. The danger of contamination of the switch cabinet interior due to unfiltered air is particularly high for elevator switch cabinets and escalator switch cabinets since such switch cabinets are arranged in machine rooms or hoistways and escalators, which usually are not, or only with difficulty, accessible for regular overall cleaning, so that much dust and dirt accumulates in such spaces in the course of time.

In practical application, a chassis according to the invention is surrounded by an enclosing housing or enclosure. The latter may be formed in particular by a switch cabinet housing accommodating at least one chassis according to the invention. This enclosure may also be designed such that it limits the longitudinal slidability of a mounting rail inserted in the shaped part of the respective chassis in at least one longitudinal sliding direction.

In an embodiment of the invention in which a plurality of chassis of the type according to the invention are accommodated in a switch cabinet, each chassis would constitute a module adapted to be separately inserted into and removed from the switch cabinet. Preferably, each module has at least one fan of its own, with the overall ventilation system being designed such that an excess ventilation pressure is created in the switch cabinet.

In a particularly preferred embodiment of a switch cabinet according to the invention, the switch cabinet housing and at least one chassis are dimensioned such that the chassis is accommodated in the switch cabinet housing in a press fit. This has the effect that the side walls of the switch cabinet have to bear only the weight of the one chassis loaded and the switch cabinet cover, but need not have lateral stability of their own, since the latter is given to them by the one chassis accommodated in a press fit.

By way of comparison, a typical prior art elevator switch cabinet comprises a switch cabinet housing having a rear wall with a thickness of 3 mm, to which a transformer and other heavy parts must be bolted or otherwise firmly secured. The remaining walls of this switch cabinet housing have a sheet metal thickness of 1 to 1.5 mm. This switch cabinet housing has a weight of approximately 50 kg.

In a comparative embodiment of an elevator switch cabinet used with a chassis according to the present invention, a sheet-metal thickness of 0.8 mm is sufficient for all walls of the switch cabinet housing, thereby reducing the overall weight of the switch cabinet housing to 15 kg.

The invention can be utilized also with frequency converters for which power semiconductor components of high voltage compatibility and/or performance are employed. A frequency converter according to the invention comprises a frequency converter housing accommodating at least one chassis having the features of a chassis according to the invention as claimed and described hereinbefore.

The invention as well as further objective aspects and advantages of the invention will now be elucidated in more detail by way of embodiments. These relate to a switch cabinet for elevators or escalators which contains three modules, namely a control module, a frequency converter module (hereinafter referred to as drive module) and a filter module, with one chassis according to the invention each.

BEST MODE FOR CARRYING OUT THE INVENTION

Figure 1:
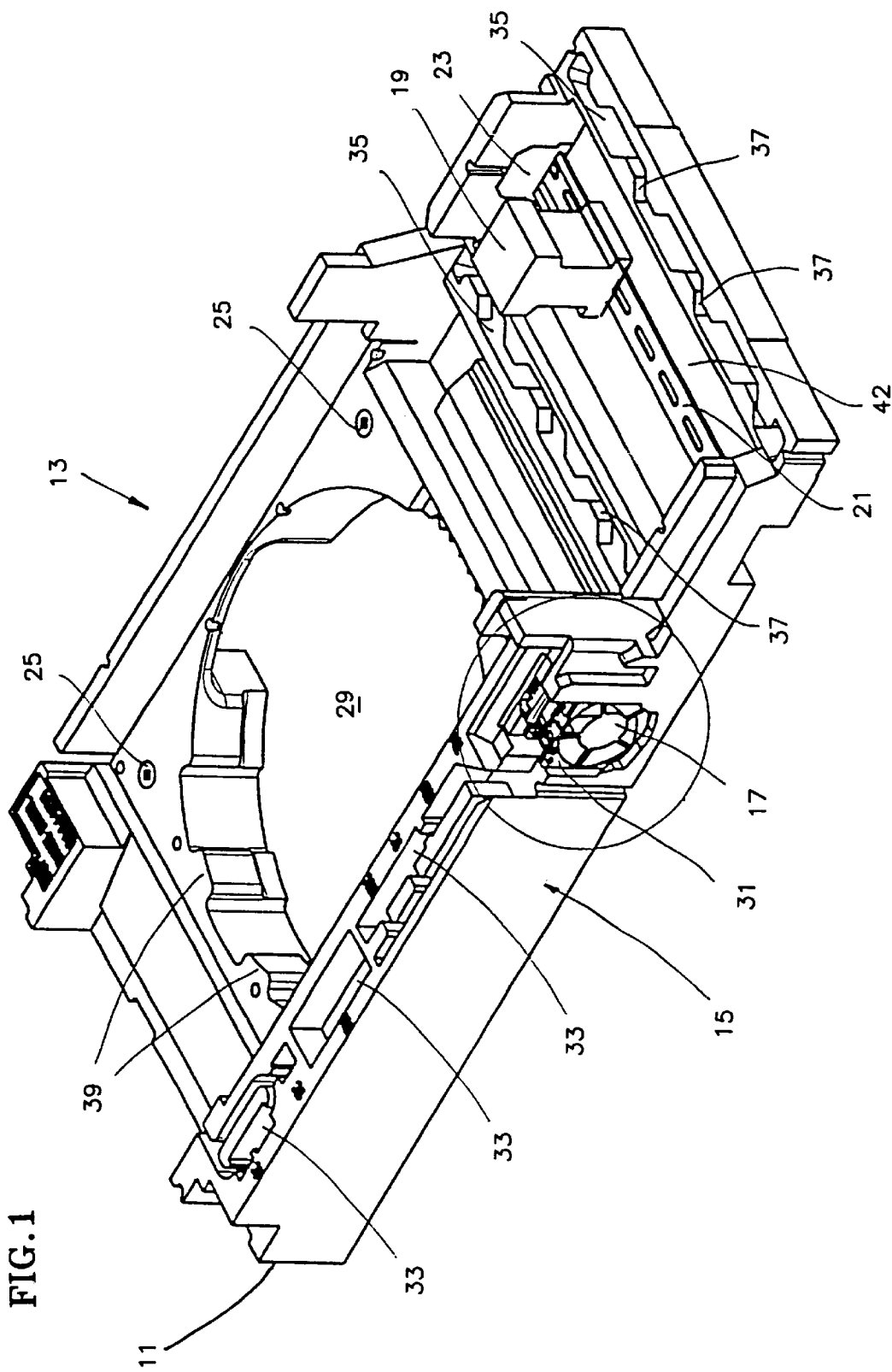
FIG. 1 shows a perspective view of an inventive chassis of a control module, that is partly equipped with component units.
Figure 8:
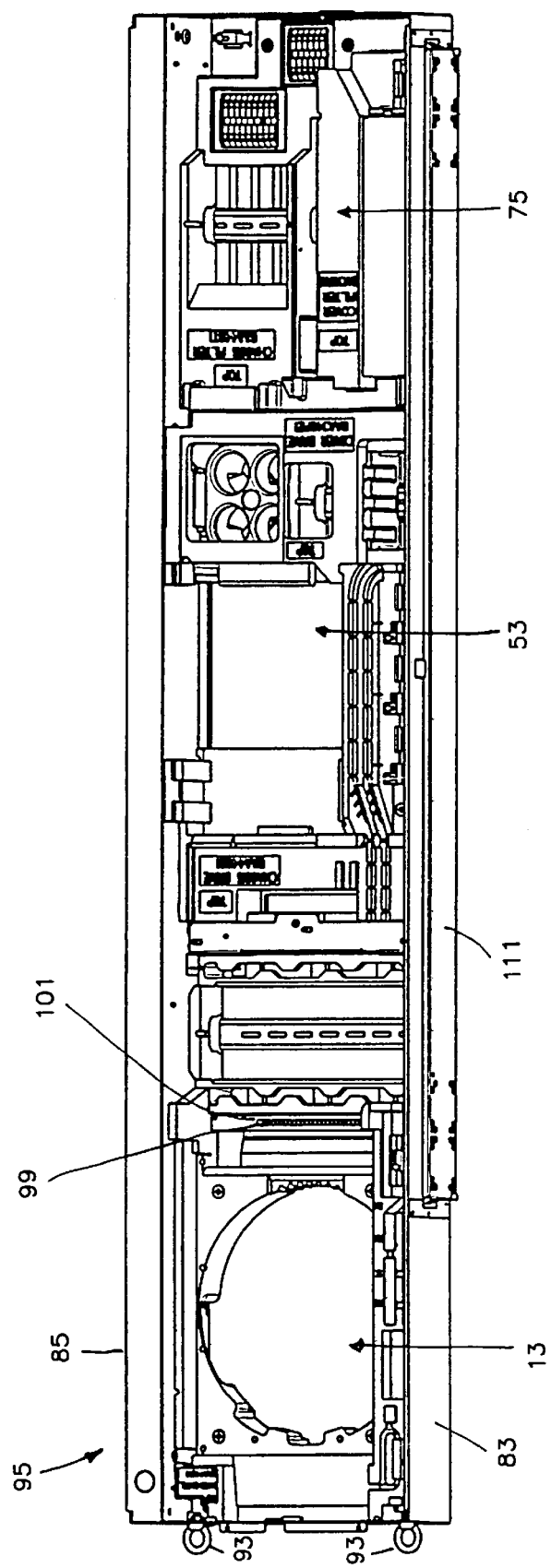
FIG. 8 shows a perspective view of a circuit arrangement comprising the control module shown in FIGS. 1 to 4, the drive module shown in FIGS. 5 to 7 and an additional filter module, which are accommodated in a common enclosure, as seen in a plan view of a first longitudinal side.

FIG. 1 shows in a perspective view an embodiment of a chassis 11 according to the invention for a control module 13 of the circuit arrangement shown in FIG. 8. Chassis 11 has a shaped part 15 which is composed of a plastic material with lasting resetting force with respect to compression. In FIG. 1, shaped part 15 is shown equipped only with a few of the component units and components of the finished control module 13, namely with a fan 17, a relay 19, a mounting rail 21, at least two rail anchoring elements 23, of which only one can be seen in FIG. 1, and dowels 25, of which only two can be seen in FIG. 1, for fixation of a transformer (not shown).

Shaped part 15 is provided with an approximately circular transformer receiving recess 29 and with an approximately U-shaped fan receiving recess 31. Both receiving recesses 29 and 31 are designed and dimensioned such that they receive the fan 17 and the transformer, respectively, in substantially form-locking manner over a substantial part of their respective circumference, so as to be in a press fit, so that they are thereby retained in their position with the aid of the resetting force of the plastic material of the shaped part.

In addition to the two aforementioned receiving recesses 29 and 31, shaped part 15 has further receiving recesses, all designated 33 but serving to accommodate different component units, for example fuses, electronic control means etc. Moreover, shaped part 15 is provided with two upwardly open cable ducts 35 each having a meander-like channel shape and being each provided with a plurality of strain-relieving constrictions 37.

Figure 3:
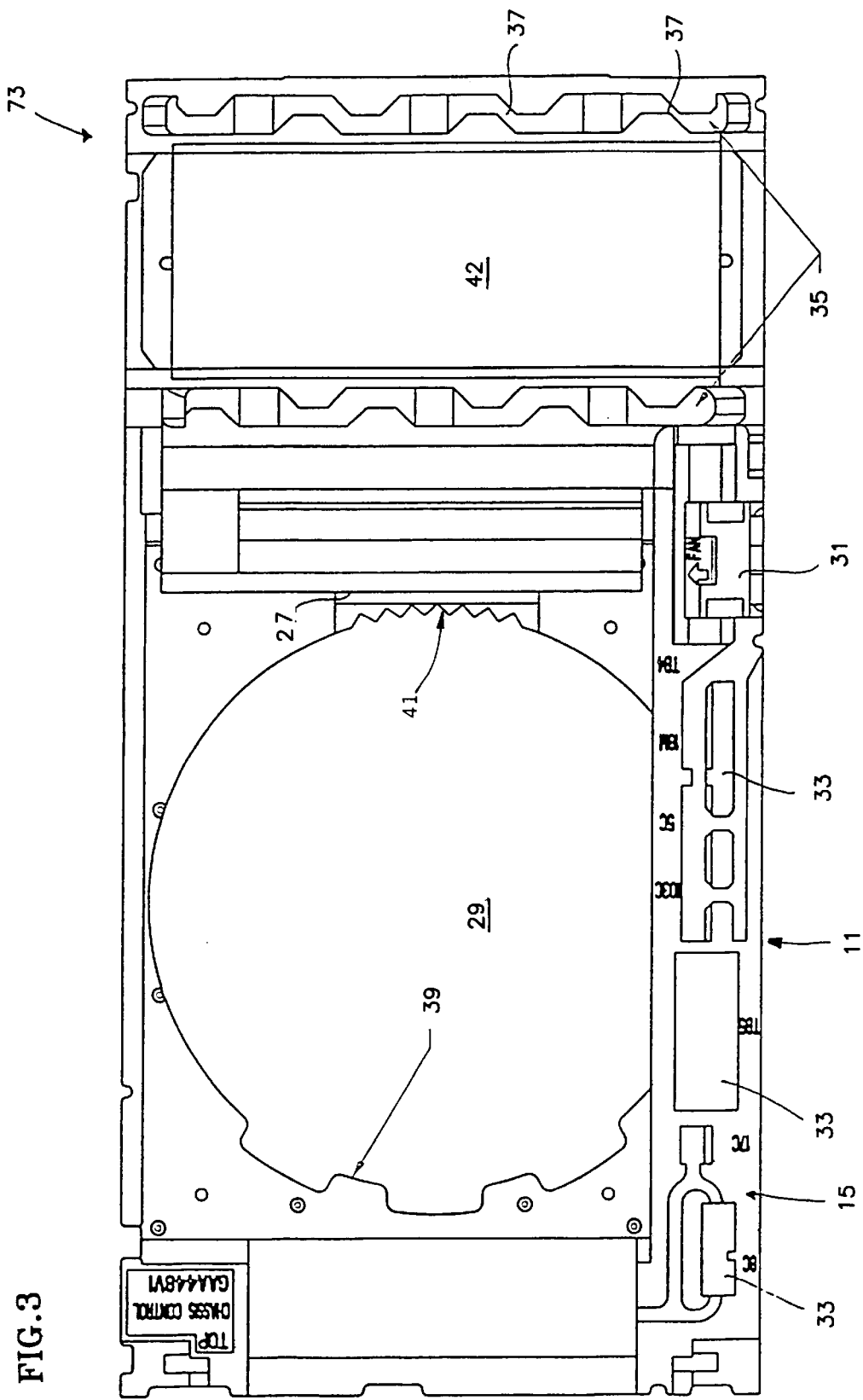
FIG. 3 shows a plan view of the chassis according to FIGS. 1 and 2 prior to providing the same with component units and components.

The transformer receiving recess 29 is approximately of circular shape and is provided on the one hand at several circumferentially distributed locations with compression ribs 39 and with recesses or teeth 41 on a side about diagonally opposite said compression ribs 39; said recesses or teeth 41 adapted to permit the transformer connecting cables (not shown) to be passed therethrough. As shown in FIG. 3, the region in which teeth 41 are located is recessed with respect to the peripheral edge of transformer receiving recess 29 at which dowels 25 are provided. When the transformer is mounted, this recess is covered by a roof-like sealing lip 27. The sealing lip thus provides both a substantially airtight seal for preventing a flow of cooling air past the sealing lip, and a cable feed-through avoiding pinching of the transformer cables. The sealing lip is elastically yielding in the region of the cable and thus seals around the cable and the teeth 41. In addition thereto, shaped part 15 has a free space 42 accommodating component units of the second type, which for the reasons indicated hereinbefore should not be accommodated in a form-locking receiving recess, but in a space that is independent of their shape.

Especially suited for a chassis 11 according to the invention is a shaped part 15 of expanded polypropylene (EPP) that is one of the known resetting plastics and on the one hand displays particularly good dimensional stability and on the other hand a particularly lasting resetting effect with respect to compression. For manufacturing the shaped part 15, polypropylene granulate is blown under pressure in a correspondingly shaped injection mold. In addition thereto, hot steam is introduced into the injection mold, which effects on the one hand popping open of the granulate into foamed beads of EEP and on the other hand adhesion of the foamed beads so as to form the shaped part 15. It is possible to influence the density and thus the resetting force of the foamed plastics material of the shaped part 15 obtained in this manner by controlling the quantity of granulate and the steam pressure.

The mounting rail 21 used for chassis 11 is preferably a so-called top hat rail according to European standards EN 50022 and EN 50045, which is available from the company WAGO (WAGO Kontakt-Technik GmbH, Hansastr. 27, D-32385 Minden, Germany). The rail anchoring elements 23 cooperating with a mounting rail 21 of this type are available from WAGO as well.

Figure 2:
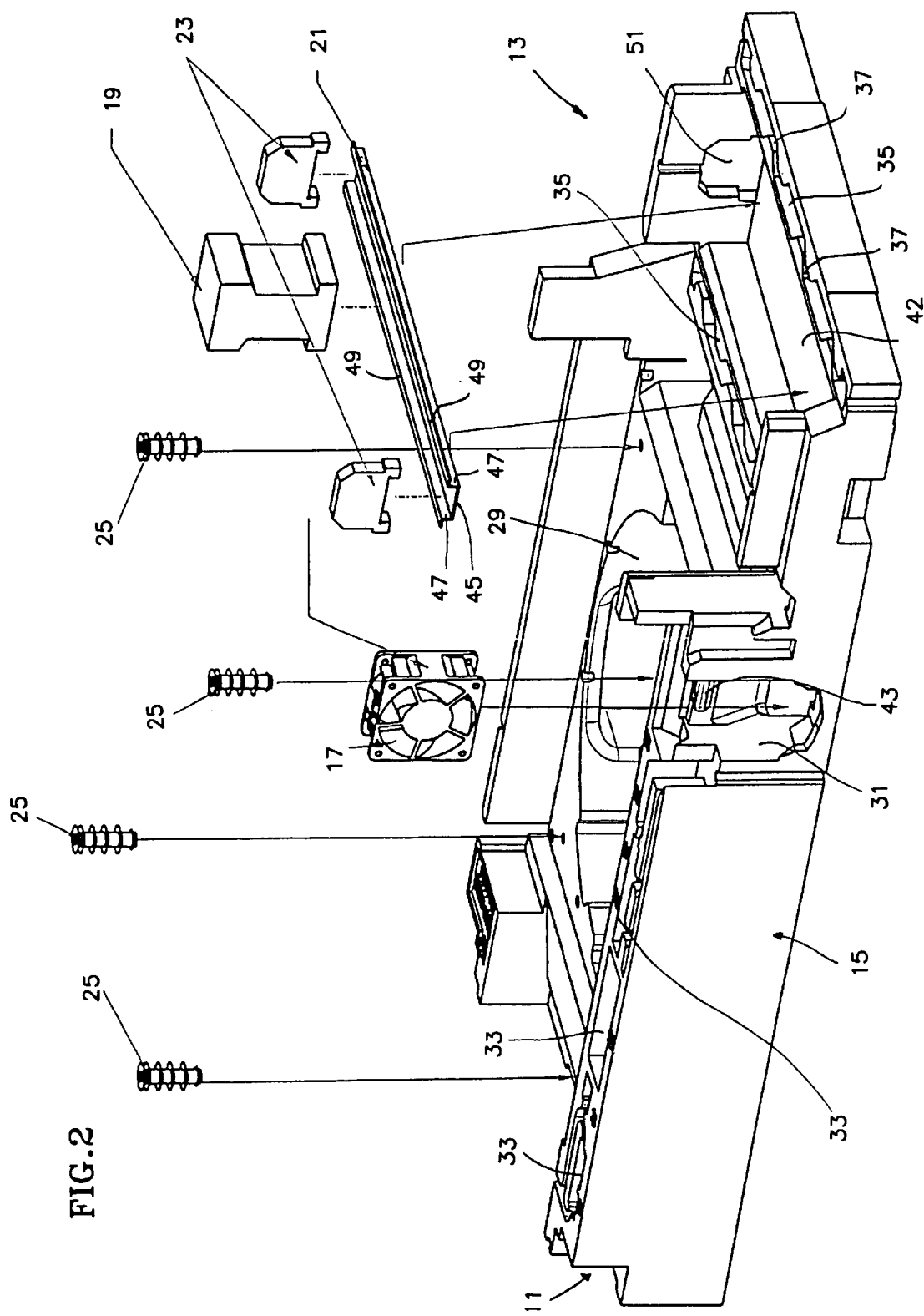
FIG. 2 shows a perspective, exploded view of the chassis of FIG. 1, illustrating component units and components prior to insertion thereof in the chassis.

The perspective exploded view of FIG. 2 shows component units and components, which are already provided in shaped part 15 in the assembly phase shown in FIG. 1, prior to insertion thereof in shaped part 15. FIG. 2 in particular shows, more clearly than FIG. 1, the shape of the fan receiving recess 31, the mounting rail 21 and of the rail anchoring elements 32. As regards the fan receiving recess 31, a retaining nose 43 molded to shaped part 15 should be mentioned, below which the fan housing is latchingly engaged after fan 17 has been urged into fan receiving recess 31 in the direction indicated in FIG. 2.

Mounting rail 21 designed as top hat rail is an approximately U-shaped rail having a rail bottom 45 from both longitudinal sides of which there is upstanding one rail side wall 47 each, with the free end thereof being provided with a rail edge 49 projecting outwardly from the respective rail side wall 47 and extending approximately parallel to rail bottom 45. Components (not shown) that can be mounted to such a mounting rail 21 have a matching, complementary shaped portion matched to mounting rail 21 and additionally have holding parts engaging over the rail edges 49, said holding parts permitting these components to be slid onto the mounting rail 21 from one end thereof or to be snapped onto the mounting rail 21 in a direction perpendicular to the rail bottom 45. Rail anchoring elements 23 may be provided with a clamping mechanism (not shown in the drawings) which cooperates with a screw threadedly engaged with the respective rail anchoring element 23 and, by means of this screw, is adjustable between a condition in which rail anchoring element 23 can be slidingly moved on mounting rail 21 very easily, and a condition in which the rail anchoring element 23 is firmly anchored in position to mounting rail 21.

For each of the two rail anchoring elements 23, there is provided in shaped part 15 an anchor receiving opening 51 of approximately matching shape, with FIG. 2 showing only one thereof. In the embodiment shown, the anchor receiving opening 51, shown in FIG. 2, is configured to extend completely through the corresponding portion of shaped part 15, so that the mounting rail 21 can be slidingly inserted into the free space 42 from the corresponding side. Thus, if relay 19 is adapted to be snapped onto the mounting rail from above, the left-hand rail anchoring element 23 in FIG. 2, can be attached and fixed at the left-hand end of mounting rail 21 and the assembled anchoring element and rail inserted into free space 42 from the right-hand side in FIG. 2 through anchor receiving opening 51 visible in FIG. 2.

If the mounting rail 21 does not extend over the entire width of shaped part 15, so that the longitudinal slidability thereof, after insertion of shaped part 15 in an enclosing housing or enclosure, cannot be confined by the same, one of the anchor receiving openings 51 can be provided with a longitudinal sliding motion stopper which cooperates, for example, with the adjacent rail anchoring element 23, with an additional stopper element being arranged on the outside of the other anchor receiving opening 51 upon full introduction of mounting rail 21, with the mounting rail 21 being then hindered from a longitudinal sliding motion in both longitudinal sliding motion directions. If a longitudinal end of mounting rail 21, in the final position thereof, extends up to a side wall of shaped part 15, this additional longitudinal sliding motion stopper may be part of the enclosure into which shaped part 15 is inserted.

Figure 4:
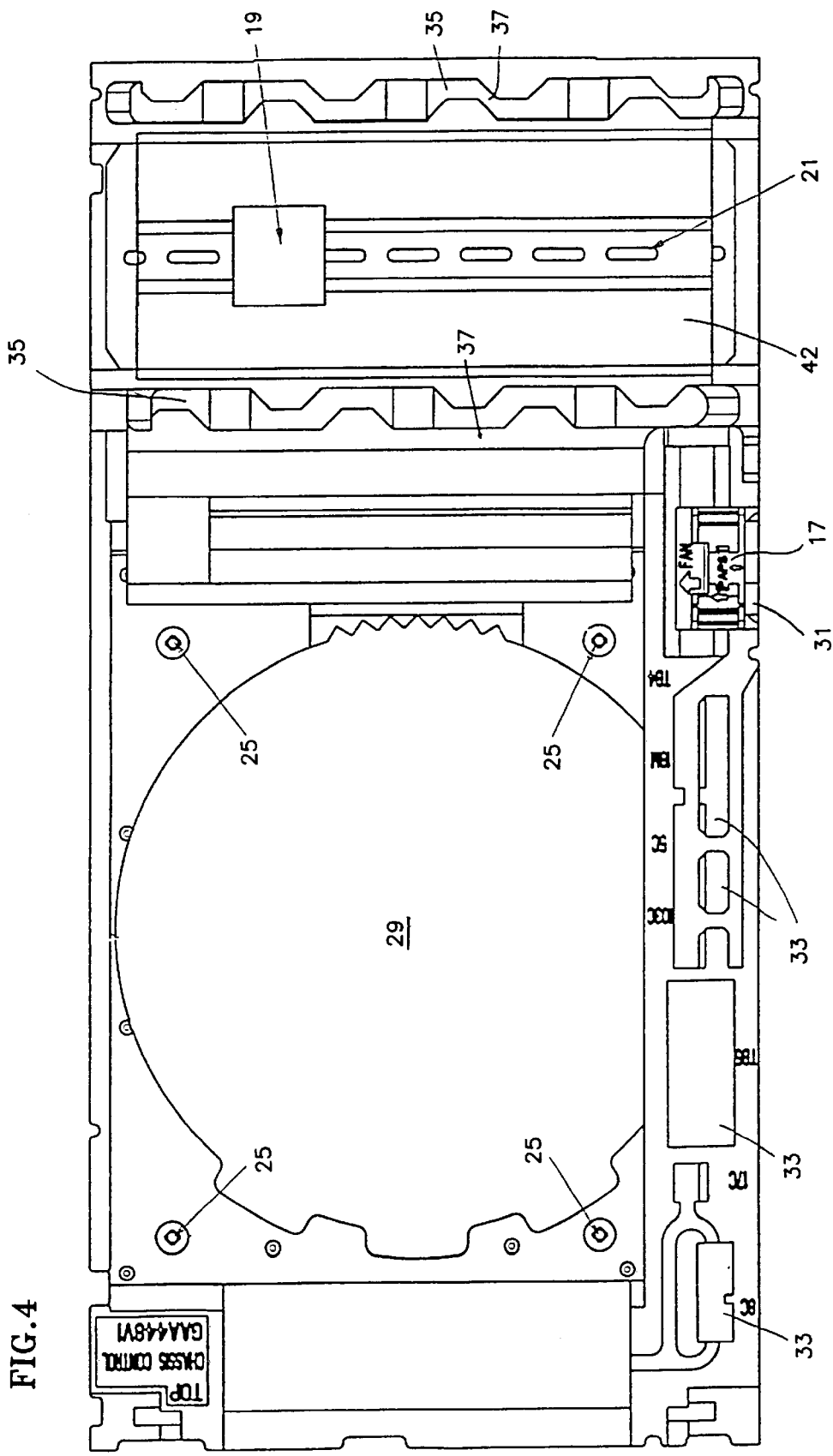
FIG. 4 shows a plan view similar to FIG. 3, however after insertion of component units and components.

FIG. 3 shows a top plan view of shaped part 15 of chassis 11 shown in FIGS. 1 and 2, prior to insertion of component units and components. FIG. 4 shows the same view of this shaped part 15, however after insertion of component units, namely the fan 17, the transformer and the relay 19, and of components, namely the mounting rail 21 and the rail anchoring elements 23 (not visible in FIG. 4). The cable ducts 35 and the strain-relieving constrictions 37 thereof are visible particularly clearly in FIGS. 3 and 4.

The transformer receiving recess 29 is designed for receipt of an approximately circular transformer, i.e. a ring core transformer. The circular shape of the transformer receiving recess 29 continues below the shaped part wall portion having the receiving recesses 33 formed therein, in a manner not visible in FIGS. 3 and 4.

After insertion of the transformer (not shown) in the transformer receiving recess 29, a cover part (not shown), for example of metal, is disposed thereabove which is fastened to shaped part 15 by means of dowels 25. The transformer then is secured against falling out from the transformer receiving recess 29, for example in case of tipping over of chassis 11.

Figure 5:
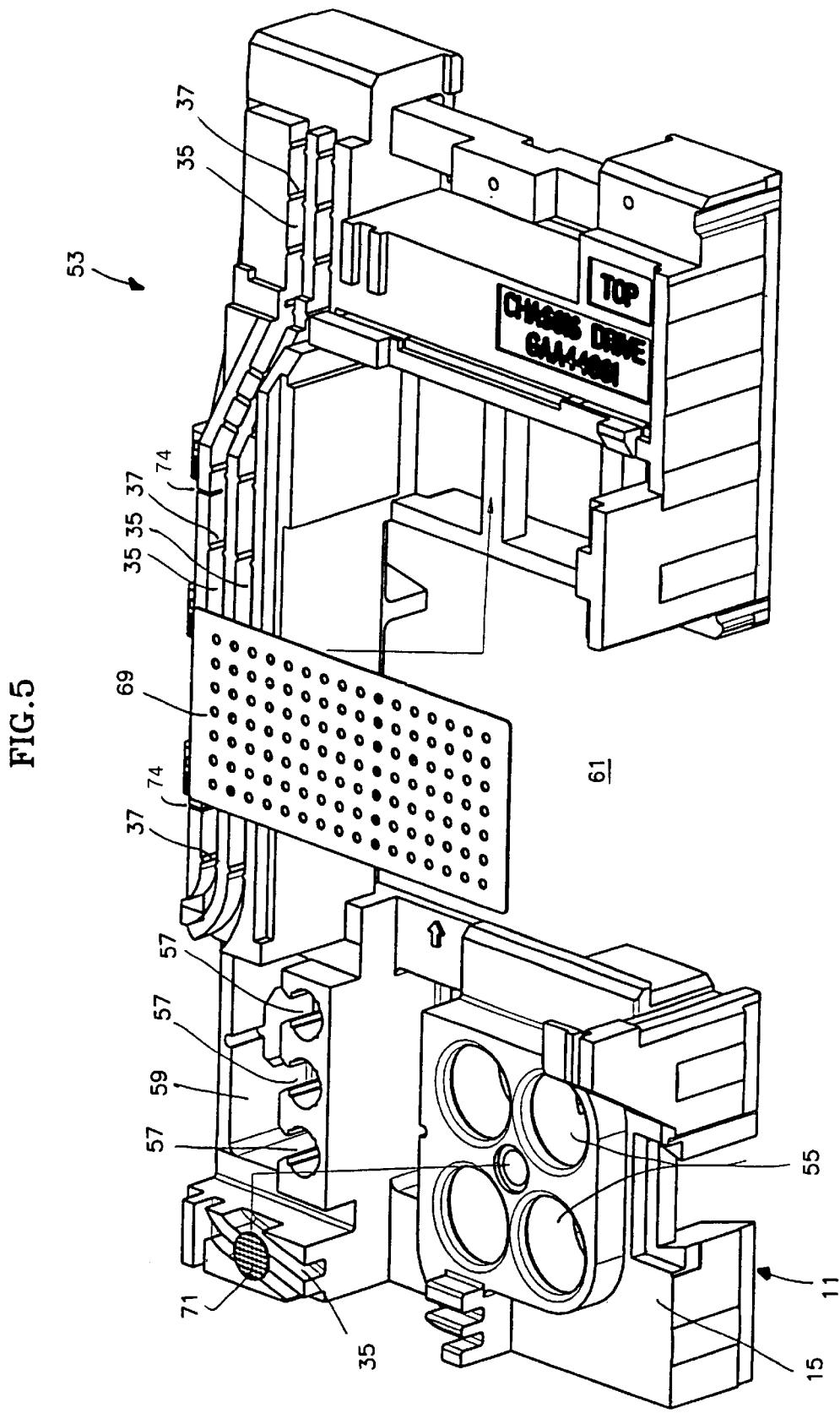
FIG. 5 shows a perspective view of a chassis according to the invention for a drive module prior to the provision of component units and components, along with an exploded view as regards a ventilation grid.
Figure 6:
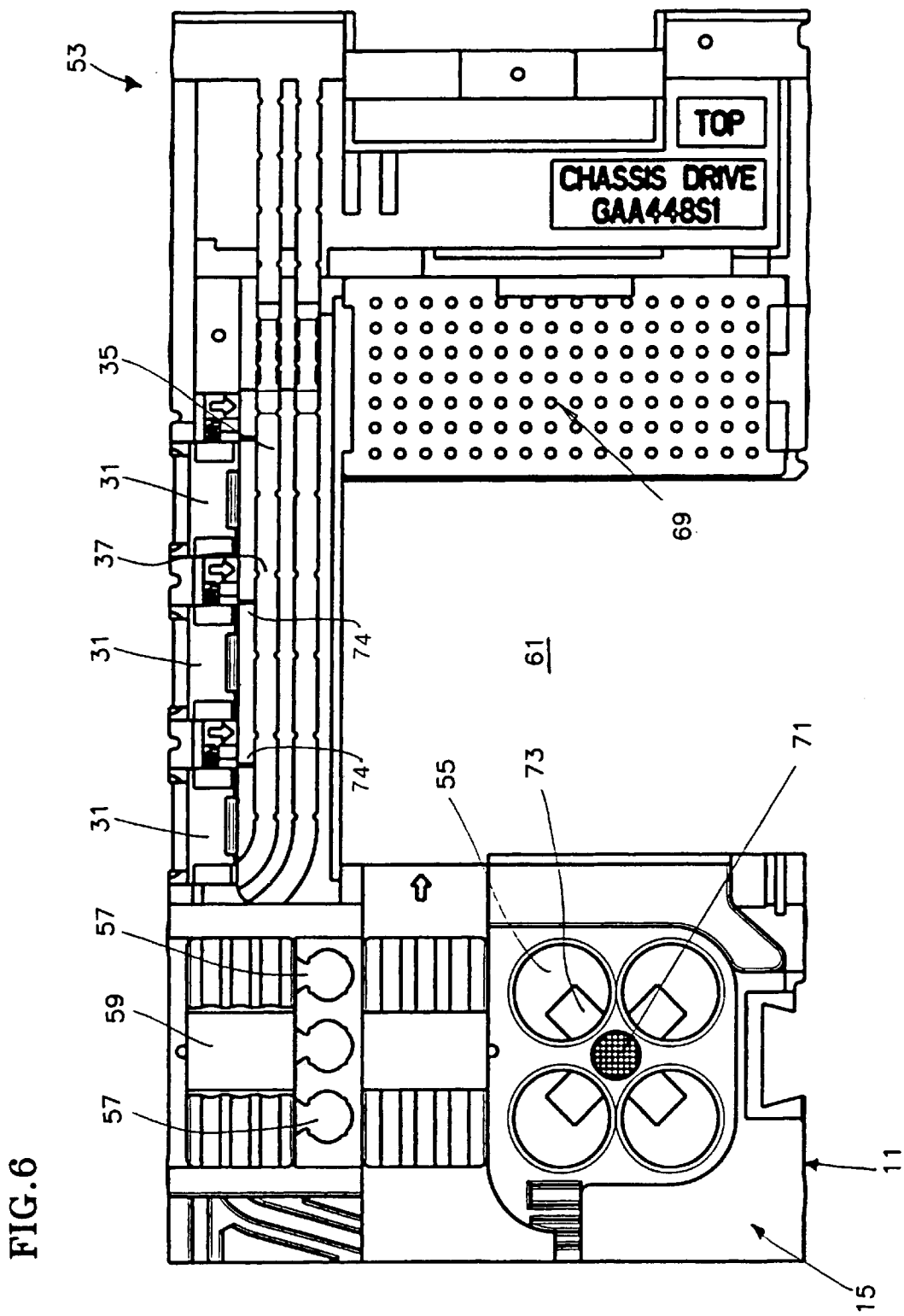
FIG. 6 shows a plan view of the chassis shown in FIG. 5 with assembled ventilation grid.
Figure 7:
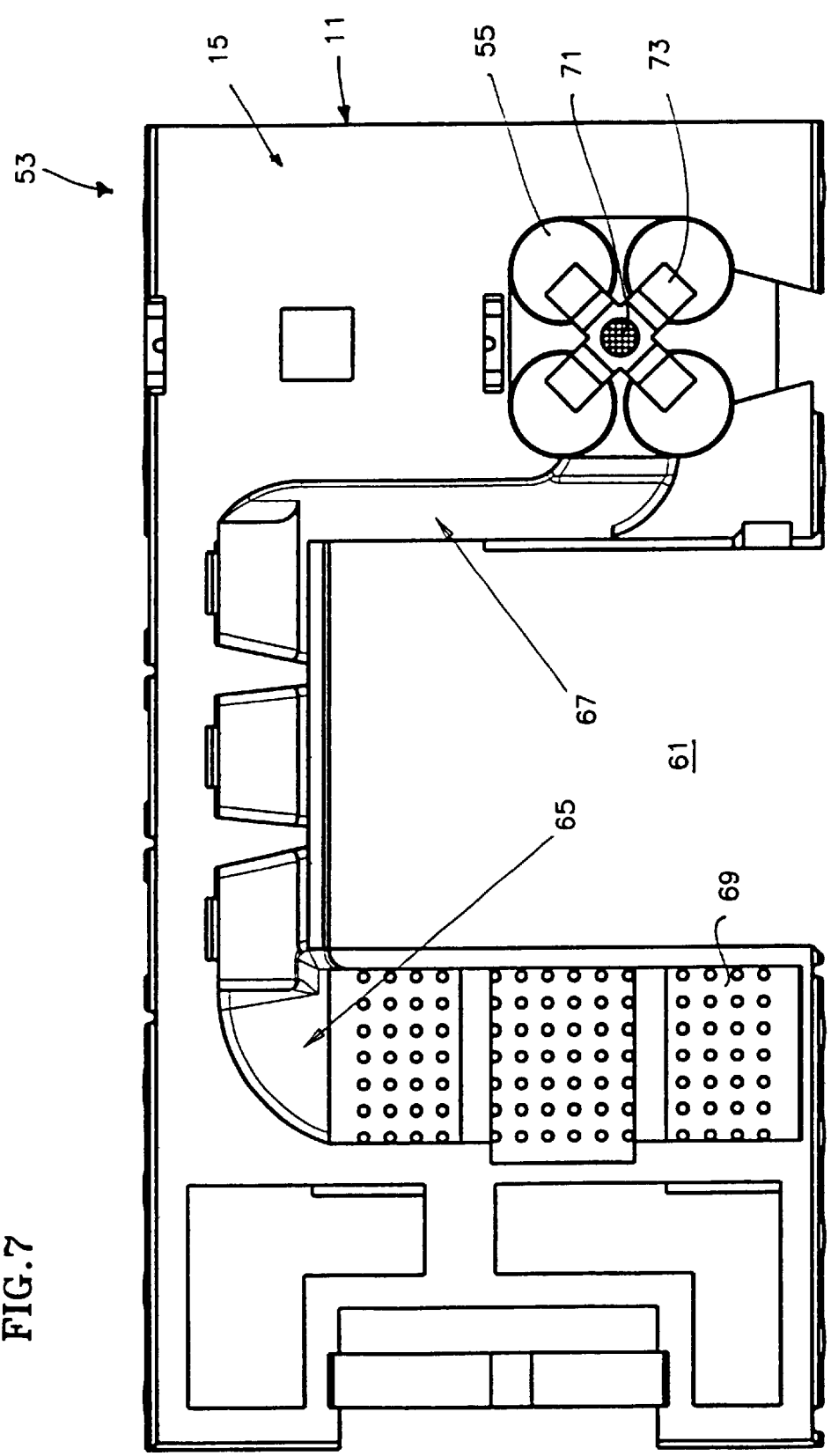
FIG. 7 shows a bottom side view of the chassis shown in FIG. 6.
Figure 11:
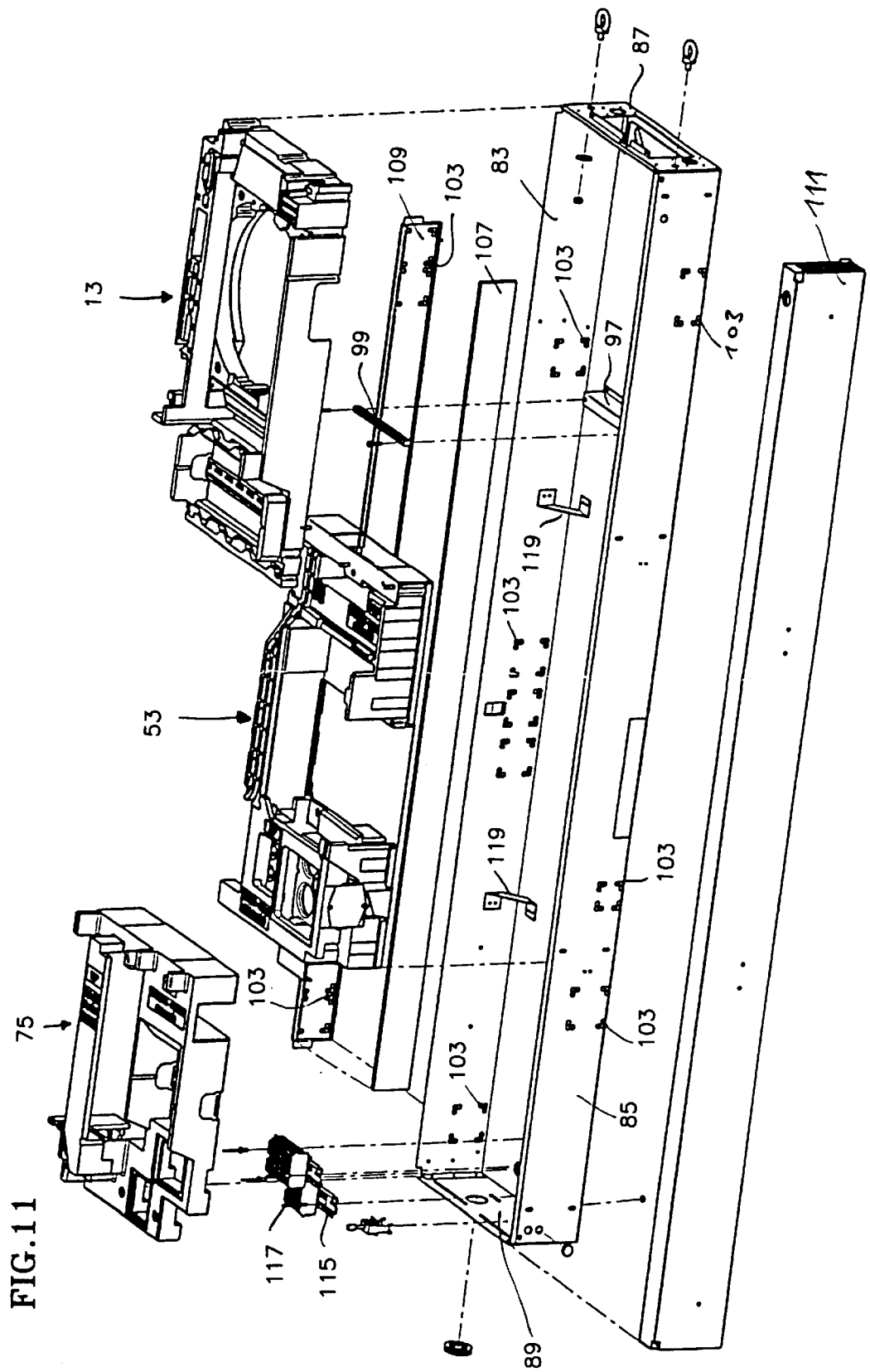
FIG. 11 shows an exploded view of the circuit arrangement of FIG. 10 prior to accommodation thereof in the common enclosure.

FIGS. 5 to 7 show a second module of the circuit arrangement illustrated in FIG. 11, namely a drive module 53 containing a drive circuit of the circuit arrangement.

In FIGS. 5 to 7 components and parts corresponding to components and parts of the control module illustrated in FIGS. 1 to 4, are designed with the same numerals although they may differ in shape from the corresponding components and parts of the control module.

The shaped part 15 of drive module 53 comprises capacitor receiving recesses 55, resistor receiving recesses 57, a free space 59 for a relay, an energy supply unit receiving recess 61, i.e. a recess 69 for receiving a heat sink with attached power components, cable ducts 35 with cable-retaining and stress-relieving constrictions 37 as well as three fan receiving recesses 31 best visible in FIGS. 6 and 7.

From fan receiving recesses 31, a first cooling air flow channel 65 and a second cooling air flow channel 67 extend to the region of the capacitor receiving recesses 55. An outlet portion of first cooling air flow channel 65 is covered with a ventilation grid 69 serving as an air filter, whereas an end portion of the second cooling air flow channel 67 located in the region between the four capacitor receiving recesses 55 is covered with a ventilation grid 71 also serving, in this embodiment, as an air filter. In this manner, cooling air is introduced into the region of the capacitor receiving recesses 55 purposefully and in a cleaned state. The energy supply unit (not shown) is directly cooled by fan 31. This provides for positive cooling of the energy supply unit (not shown) and the capacitors (not shown either).

The capacitor receiving recesses 55 are downwardly open. That is to say, they have no downwardly closing floor. Underneath each capacitor receiving recess 55 there is a supporting web 73 extending only over part of the diameter of the respective capacitor receiving recess 55. This provides for considerably better cooling of the capacitors received by the capacitor receiving recesses 55 than if the capacitor receiving recesses 55 had a closed cup shape. Supporting webs 73 support the capacitors so that the latter can be introduced into the respective capacitor receiving recess 55 over a predetermined distance only. For differently long capacitors with equal diameter, there may be provided supporting webs 73 at different heights in the capacitor receiving recesses 55. If a longer capacitor is to be inserted in such a receiving recess 55, interfering supporting webs 73 provided for shorter capacitors simply can be broken off. In the extreme case, the capacitor projects through the entire receiving recess 55 and all supporting webs 73 are broken off. Preferably, the supporting webs 73 are provided such that inserted capacitors of different length terminate substantially at the same height with respect to the edge of the receiving recess 55.

At least one side wall of at least one of the cable ducts 35 is formed with narrow incisions 74 via which individual ones of the cables or wires inserted in the cable ducts 35 can be passed out of this cable duct 35 in lateral direction, with the incisions 74 being dimensioned such that they serve as strain relief for the cables or lines passed through the same.

Figure 9:
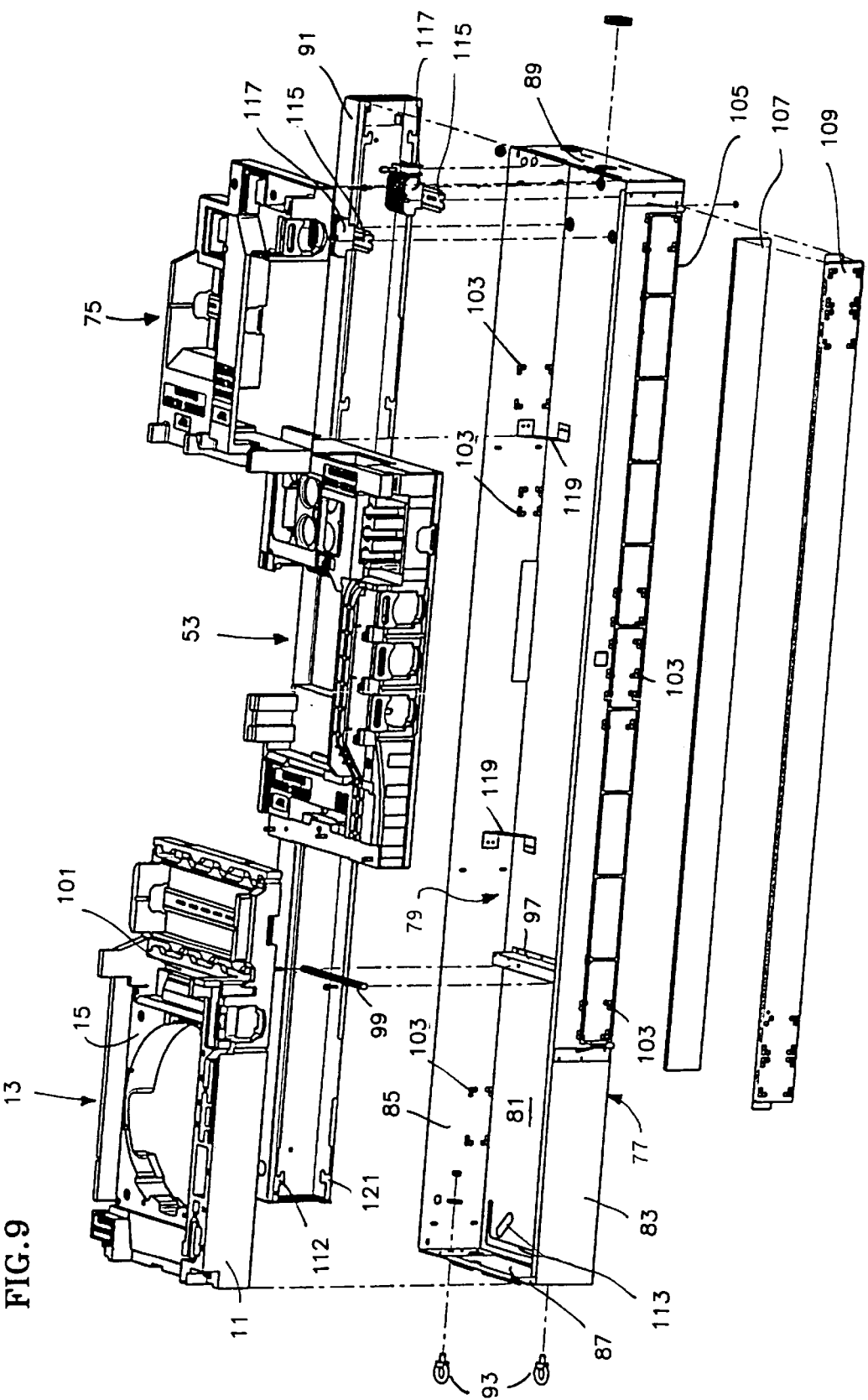
FIG. 9 shows the circuit arrangement of FIG. 8 in an exploded view, before accommodation thereof in the common enclosure.
Figure 10:
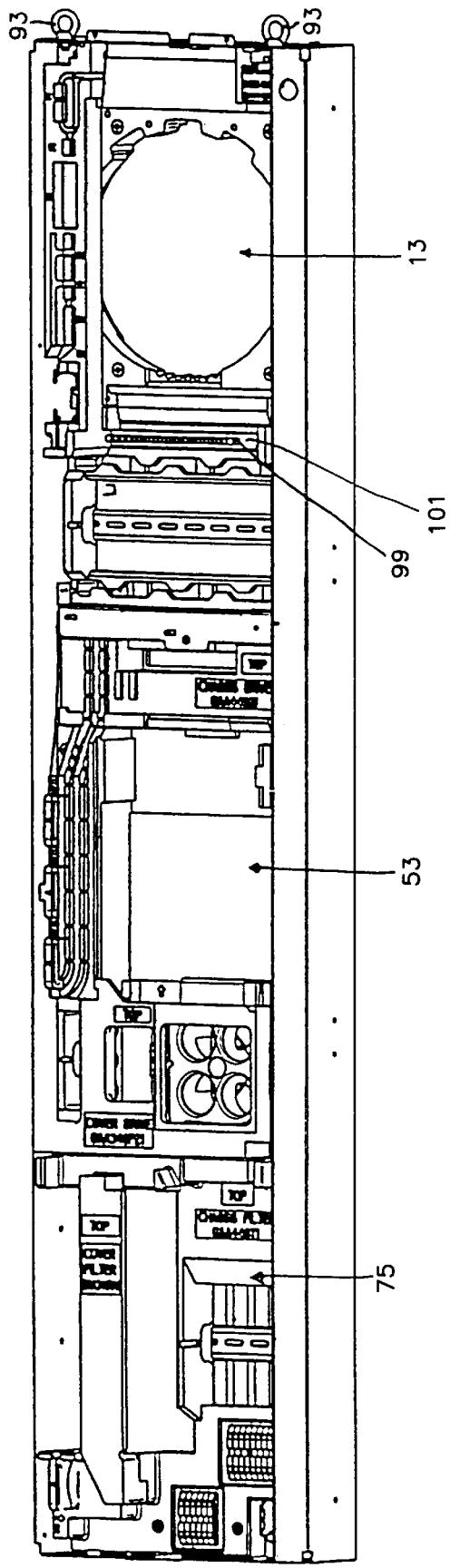
FIG. 10 shows a perspective view of the circuit arrangement of FIG. 8, as seen in a plan view of a second longitudinal side.

FIGS. 8 to 10 show a circuit arrangement comprising control module 13, drive module 53 and a filter module 75 with a common switch cabinet housing 77; FIGS. 8 and 10 show the arrangement in an assembled condition as seen in plan view from different longitudinal sides; FIGS. 9 and 11 show the arrangement in exploded form as seen in plan view from different longitudinal sides.

Filter module 75 has a chassis and a shaped part constructed in similar manner as in modules 13 and 53 described hereinbefore, though having a different shape. A detailed description of filter module 75 as well is thus not necessary. The general configuration thereof can be seen from FIGS. 8 to 11.

Switch cabinet housing 77 forms an enclosure for the three modules 13, 53 and 75. As can be seen best in FIG. 9, switch cabinet housing 77 comprises a housing trough 79 having a housing bottom 81, and, with respect to FIG. 9, a front longitudinal side wall 83, a rear longitudinal side wall 85, a left-hand narrow side wall 87 and a right-hand narrow side wall 89. In the assembled state of the switch cabinet, housing trough 79 is closed by means of a housing cover 91.

At the left-hand narrow side wall 87, there are mounted jack rings 93 in the assembled state of switch cabinet housing 77, by means of which the finished switch cabinet 95 can be lifted and transported to a predetermined location of a hoistway wall or the escalator. The switch cabinet 95 is mounted there in such a manner that the jack rings 93 are disposed at the top and the right-hand narrow side wall 89 in FIG. 9 is disposed at the bottom, with the housing bottom 81 abutting the wall of the hoistway or escalator, respectively.

On the inside of housing bottom 81 there is provided a supporting rail 97. On the top side thereof directed upwardly in FIG. 9, there is mounted an electric connector 99. When switch cabinet 95 is attached to the hoistway wall, supporting rail 97 serves to support the weight of the transformer accommodated in control module 13 as pressure force on the shaped part 15 of control module 13. To this end, supporting rail 97, in the finished condition of switch cabinet 95, projects into a complementary supporting recess in the bottom side of shaped part 15 of control module 13. In the embodiment shown in the figures, this supporting recess 101 constitutes a passage through the entire width of the shaped part 15 of control module 13, so that electric connector 99 is visible in plan view in FIGS. 8 and 9.

The longitudinal side walls 83 and 85 have air inlet or air discharge openings 103. On the outside of each longitudinal side wall 83, there are provided, from the inside towards the outside, a grid-like spacer member 105, a filter mat 107 and a filter mat cover plate 109 that is also provided with air discharge openings 103. In FIG. 11, spacer member 105, filter mat 107 and filter mat cover plate 109 are shown in the form of a mounting unit 111 that can be fastened to the respective longitudinal side wall 83 by means of suitable fastening members. Shown on the left-hand end of housing bottom 81 in FIG. 9 are mounting holes 113 cooperating with wall mounting members on the hoistway wall on which switch cabinet 95 is to be suspended.

FIGS. 9 and 11 show, at the end of switch cabinet housing 77 opposite the jack rings 93, top hat rail pieces 115 which are riveted to housing bottom 91 and are provided with clamping rails 117 carrying grounding terminals.

FIGS. 9 and 11 show reinforcing angle pieces 119 by means of which stiffening of switch cabinet housing 77 is obtained.

Housing cover 91 is provided with locking members 121 by means of which it can be locked to housing trough 79. The housing cover is provided furthermore with air discharge openings (not shown) for exhaust air that was inducted through opening 103 in side wall 85 and then was used for active cooling of the switch cabinet components as described above.

In so far as details of the above-elucidated chassis, modules and housings have not been described, reference is made to the detailed representations in the drawings.

A chassis according to the invention can also be used well for frequency converters having semiconductor components designed for high power and/or high voltages. Such a chassis for a frequency converter, just like the modules described hereinbefore, comprises a shaped part formed with receiving recesses and free spaces and, if necessary, having at least one mounting rail and/or dowel. This chassis, too, can be accommodated in an enclosure or in an apparatus housing. Differences from the afore-described modules for an elevator or escalator switch cabinet are present merely with respect to the specific configuration of the shaped part and the electric and mechanical component units to be accommodated therein. A detailed description of such a frequency converter is thus not necessary.

What is claimed is:

1. A chassis (11) for mounting component units (17, 19) of an electric switch cabinet for elevators and escalators, comprising: at least one shaped part (15) serving as main supporting member, which consists of a plastic material with lasting resetting force with respect to compression and is provided with at least one receiving recess (29, 31) for receiving a component unit (17) of a first type in a substantially form locking manner, and comprising at least one mounting rail (21) serving as auxiliary supporting member and anchored in the shaped part (15), said mounting rail (21), at least over a predetermined partial length thereof, being accessible in a free space (42) of the shaped part (15) for mounting at least one component unit (19) of a second type to said mounting rail (21), with said free space (42) being designed to selectively receive component units of the second type in different numbers, shapes and sizes.

2. The chassis of claim 1,
   wherein the shaped part (15) is at least upwardly open.

3. The chassis of claim 1,
   wherein the mounting rail (21) thereof is constituted by an approximately U-shaped rail having a rail bottom (45) with a rail side wall (47) upstanding from both longitudinal sides thereof, the free end of each rail side wall being provided with a rail edge (49) projecting outwardly from the respective rail side wall (47) and serving for attachment of component units (19) of a second type by means of fastening elements of complementary design.

4. The chassis of claim 3,
   wherein the mounting rail (21) thereof is composed with metal.

5. The chassis of claim 4,
   wherein the mounting rail (21) thereof is held in the shaped part (15) so as to be longitudinally slidable therein.

6. The chassis of claim 5,
   wherein the longitudinal slidability of the mounting rail (21) within the shaped part (15) is unlimited in at least one longitudinal sliding direction.

7. The chassis of claim 6,
   wherein the longitudinal slidability of the mounting rail (21) within the shaped part (15) is unlimited in one longitudinal sliding direction and is limited in the opposite direction by a side wall (85) of a switch cabinet housing (77).

8. The chassis of claim 1, wherein in at least two spaced apart locations along the length of the mounting rail (21), there is releasably mounted one rail anchoring element (23) each which is received in an anchor receiving opening (51) of shaped part (15) of approximately matching shape.

9. The chassis of claim 8, wherein a first one of said two anchor receiving openings (51) is configured to extend completely through the insert (15) and permits free longitudinal slidability of the respective associated rail anchoring element (23).

10. The chassis of claim 1, wherein at least one dowel-like fastening element (25) is introduced in a surface of the shaped part (15).

11. The chassis of claim 1, wherein a least one cable receiving duct (35) is introduced into the shaped part (15), said cable duct (35) being provided with at least one strain relief means (37).

12. The chassis of claim 11, wherein the cable duct (35) thereof is provided with at least one cable strain relieving constriction (37).

13. The chassis of claim 1, wherein at least one fan receiving recess (31) is provided for receipt of at least one motor-driven fan (17) for ventilation of a ventilation space of the shaped part (15), with cooling air flow channels (65, 67) being formed in said ventilation space.

14. The chassis of claim 13, comprising at least one cooling air filter (107).

15. The chassis of claim 14, wherein at least one of said cooling air filters is disposed adjacent a grid-like spacer (105).

16. The chassis of claim 1, wherein the shaped part (15) is enclosed by an enclosure (77).

17. The chassis of claim 16, wherein the longitudinal slidability of the mounting rail (21) is limited in at least one of said two longitudinal sliding directions by said enclosure (77).

18. An electric switch cabinet for elevators and escalators, comprising a switch cabinet housing (77) having at least one chassis (11) including at least one shaped part (15) serving as main supporting member, which consists of a plastic material with lasting resetting force with respect to compression and is provided with at least one receiving recess (29, 31) for receiving a component unit (17) of a first type in a substantially form locking manner, and comprising at least one mounting rail (21) serving as auxiliary supporting member and anchored in the shaped part (15), said mounting rail (21), at least over a predetermined partial length thereof, being accessible in a free space (42) of the shaped part (15) for mounting at least one component unit (19) of a second type to said mounting rail (21), with said free space (42) being designed to selectively receive component units of the second type in different numbers, shapes and sizes.

19. The switch cabinet of claim 18, having several chassis (11) accommodated therein which are each part of a module (13, 53, 75) adapted to be separately inserted into said switch cabinet (95) and removed from said switch cabinet (95).

20. The switch cabinet of claim 18, including a ventilation system containing at least one fan (17) and at least one cooling air flow channel (65, 67), said channel configured such that an excess ventilation pressure can be generated in the switch cabinet.

21. The switch cabinet of claim 18, wherein the longitudinal slidability of the mounting rail (21) is limited in at least one of the two longitudinal sliding directions by a side wall (83, 85) of the switch cabinet (95).

22. The switch cabinet of claim 18, wherein the switch cabinet housing (77) and the at least one chassis (11) are dimensioned such that the chassis (11) is accommodated in a press fit in the switch cabinet housing (77).

* * * * *